(12) United States Patent
Kitahara et al.

(10) Patent No.: US 8,390,858 B2
(45) Date of Patent: Mar. 5, 2013

(54) IMAGE FORMING APPARATUS

(75) Inventors: Yoshinao Kitahara, Suwa (JP); Kenji Sakuda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 742 days.

(21) Appl. No.: 12/624,274

(22) Filed: Nov. 23, 2009

(65) Prior Publication Data

US 2010/0134833 A1    Jun. 3, 2010

(30) Foreign Application Priority Data

Nov. 28, 2008  (JP) .................................. 2008-303793

(51) Int. Cl.
*G06F 15/00* (2006.01)
(52) U.S. Cl. .......................... 358/1.15; 358/1.9; 358/3.16
(58) Field of Classification Search .................. 358/1.15, 358/1.9, 1.17, 3.16, 535
See application file for complete search history.

(56) References Cited

U.S. PATENT DOCUMENTS

| | | | | |
|---|---|---|---|---|
| 6,084,687 A * | 7/2000 | Miyazaki et al. | ............ | 358/1.17 |
| 7,787,043 B2 * | 8/2010 | Moriya | ........................ | 348/335 |
| 2005/0219563 A1 * | 10/2005 | Kakutani | ........................ | 358/1.9 |
| 2007/0121006 A1 * | 5/2007 | Kim | ................................ | 348/515 |
| 2007/0149124 A1 | 6/2007 | Onozawa | | |

FOREIGN PATENT DOCUMENTS

| | | |
|---|---|---|
| JP | 09-240076 A | 9/1997 |
| JP | 2004-136468 A | 5/2004 |
| JP | 2006-318262 A | 11/2006 |
| JP | 2007-158447 A | 6/2007 |
| JP | 2007-290324 A | 11/2007 |
| JP | 2007-306167 A | 11/2007 |
| JP | 2008-071307 A | 3/2008 |

* cited by examiner

*Primary Examiner* — King Poon
*Assistant Examiner* — Allen H Nguyen
(74) *Attorney, Agent, or Firm* — Kilpatrick Townsend & Stockton LLP (57) ABSTRACT

Provided is an image forming apparatus which receives image data from a host device by communication and forms an image based on the received image data on a target, the image forming apparatus including: a communication unit which receives the image data by the communication with the host device; a storage unit which is able to store the received image data; an image forming unit which ejects a fluid, to overlap one partial image forming process with another partial image forming process, in the performing of an image forming process of forming the image on the target by ejecting the fluid from nozzles on a portion of the target and performing a partial image forming process of forming a portion of the image based on the image data stored in the storage unit on the target plural times.

8 Claims, 4 Drawing Sheets

IMAGE FORMING APPARATUS

This application claims priority to Japanese Patent Application No. 2008-303793, filed Nov. 28, 2008 the entirety of which is incorporated by reference herein.

BACKGROUND

1. Technical Field

The present invention relates to an image forming apparatus.

2. Related Art

By connecting a plurality of devices by wireless communication, a degree of freedom in connection is increased and convenience for a user is improved, compared with wired communication. For example, JP-A-2007-158447 suggests a wireless communication device for controlling establishment/disconnection of wireless connection using distance information so as to realize a wireless connection by a simple operation by a user.

However, in wireless communication, a communication velocity is apt to be reduced due to an influence of noise or a distance between devices, as compared with a wired communication. A printer performing a process to receive and store image data in a buffer and a process to read and print the stored image data are performed in parallel so as to shorten the overall processing time. In such a printer, when a communication velocity is reduced, the process of receiving and storing the image data in the buffer is delayed and thus the process of printing the image data may pause. However, in an inkjet printer, if a printing process pauses, ink which is first printed dries and the ink colors are not well overlaid. Thus, the image quality deteriorates.

SUMMARY

An advantage of some aspects of the invention is that it performs an image forming process suitable for a communication velocity.

The invention employs the following units in order to achieve the above-described advantage.

According to an aspect of the invention, there is provided an image forming apparatus which receives image data from a host device by communication and forms an image based on the image data on a target, the image forming apparatus including: a communication unit which receives the image data by the communication with the host device; a storage unit which is able to store the received image data; an image forming unit which ejects a fluid, to overlap at least one partial image forming process with another partial image forming process, in performing of an image forming process of forming the image on the target by ejecting the fluid from nozzles on a portion of the target and performing a partial image forming process of forming a portion of the image based on the image data stored in the storage unit on the target plural times; a control unit which performs a parallel control for controlling the received image data to be stored in the storage unit and controlling the image forming unit to perform the image forming process when a communication velocity of the communication unit and the host device is greater than a predetermined reference velocity, and performs a serial control for controlling the received image data to be stored in the storage unit and controlling the image forming unit to perform the image forming process after the storage unit stores all the image data when the communication velocity of the communication unit and the image forming unit is less than the reference velocity.

In the image forming apparatus of the invention, when the communication velocity with the host device is greater than the predetermined reference velocity, the parallel control for controlling the image data received from the host device to be stored in the storage unit and controlling the image forming unit to perform the image forming process of forming the image on the target by performing the partial image forming process of ejecting the fluid from the nozzles on the portion of the target and forming the portion of the image based on the image data stored in the storage unit on the target plural times is performed. When the communication velocity with the host device is less than the reference velocity, the serial control for controlling the image data received from the host device to be stored in the storage unit and controlling the image forming unit to perform the image forming process after the storage unit stores all the image data is performed. By performing the parallel control so as to complete faster the image forming process when the communication velocity is greater than the reference velocity and performing the serial control such that the image forming process pauses when the communication velocity is less than the reference velocity, it is possible to prevent image quality from deteriorating. Accordingly, it is possible to perform the image forming process suitable for the communication velocity.

In the image forming apparatus of the invention, the communication unit may perform wireless communication with the host device and receive the image data. Since the communication velocity is apt to be decreased in wireless communication as compared with a wired communication, the application of the invention is of great significance.

In the image forming apparatus of the invention, the partial image forming process may move the nozzles in a main scanning direction one time and form the image based on the image data of one pass on the target by the fluid, the image forming process may form the image based on the image data on the target by alternately performing the partial image forming process and a transportation process of transporting the target by a predetermined amount in a sub scanning direction perpendicular to the main scanning direction, and the control unit may derive the communication velocity by dividing the amount of image data of first one pass in the image forming process by a that would be required to receive the image data of the first one pass by the communication unit. In this way, since any one of the parallel control and the serial control is performed based on the actual reception velocity of the image, it is possible to adequately determine which of the controls is performed. Since the communication velocity is derived using the period until the image data of first one pass is received, which is the period in which the image forming process cannot be originally performed, it is possible to perform a suitable determination without increasing the processing time.

In the image forming apparatus of the invention, the control unit (1) may stop the parallel control and performs the serial control or (2) control the host device to request an instruction for stopping the parallel control and switching to the serial control or continuously performing the parallel control to the user of the host device via the communication unit when it is determined that the processing velocity of the image data in the image forming process is faster than in the process of storing the image data in the storage unit and the image forming process needs to pause during the parallel control, stop the parallel control and perform the serial control when the communication unit receives the instruction for switching to the serial control from the host device, and continuously perform the parallel control while the image forming process properly pauses when the communication unit receives the instruction for continuously performing the parallel control from the host device. If it is determined that the image forming process needs to pause, the parallel control is stopped and the serial control is performed, and it is possible to prevent the image quality from deteriorating due to the image forming process being paused multiple times. If it is determined that the parallel control is stopped and is switched to the serial control or the parallel control is continuously performed by the instruction of the user when the image forming process needs to pause, the user can select whether the prevention of image quality deterioration due to the image forming process being paused multiple times or the reduction of the time to the completion of the image forming process due to the parallel control is preferential. In this case, the control unit may change the reference velocity such that the communication velocity is less than the reference velocity, when the parallel control is stopped and the serial control is performed. Accordingly, in the next process, the serial control is performed from the start even at the same communication velocity so as to prevent the pause of the image forming process.

The image forming apparatus, in which the above-described communication unit performs wireless communication, may further include a distance measuring unit which measures the distance between the host device and the image forming apparatus, the control unit may determine that the communication velocity of the communication unit and the host device is greater than the reference velocity and performs the parallel control when the measured distance is less than the predetermined distance, and determine that the communication velocity of the communication unit and the host device is less than the reference velocity and perform the serial control when the measured distance is greater than the predetermined distance. Generally, in wireless communication, since the communication velocity is reduced as the distance is increased, it is possible to adequately perform the image forming process by this configuration.

In this case, the control unit (1) may stop the parallel control and perform the serial control or (2) control the host device to request an instruction for stopping the parallel control and switching to the serial control or continuously performing the parallel control to the user of the host device via the communication unit when it is determined that the processing velocity of the image data in the image forming process is faster that in the process of storing the image data in the storage unit and the image forming process needs to pause during the parallel control, stop the parallel control and perform the serial control when the communication unit receives the instruction for switching to the serial control from the host device, and continuously perform the parallel control while the image forming process properly pauses when the communication unit receives the instruction for continuously performing the parallel control from the host device. If it is determined that the image forming process needs to pause, the parallel control is stopped and the serial control is performed, and it is possible to prevent image quality from deteriorating due to the image forming process being paused multiple times. If it is determined whether the parallel control is stopped and is switched to the serial control or the parallel control is continuously performed by the instruction of the user when the image forming process needs to pause, the user can select whether the prevention of image quality deterioration due to the image forming process being paused multiple times or the reduction of the time to the completion of the image forming process due to the parallel control is preferential. In this case, the control unit may change the reference velocity such that the communication velocity is less than the reference velocity, when the parallel control is stopped and the serial control is performed. Accordingly, in the next process, the serial control is performed from start even at the same communication velocity so as to prevent the pause of the image forming process.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
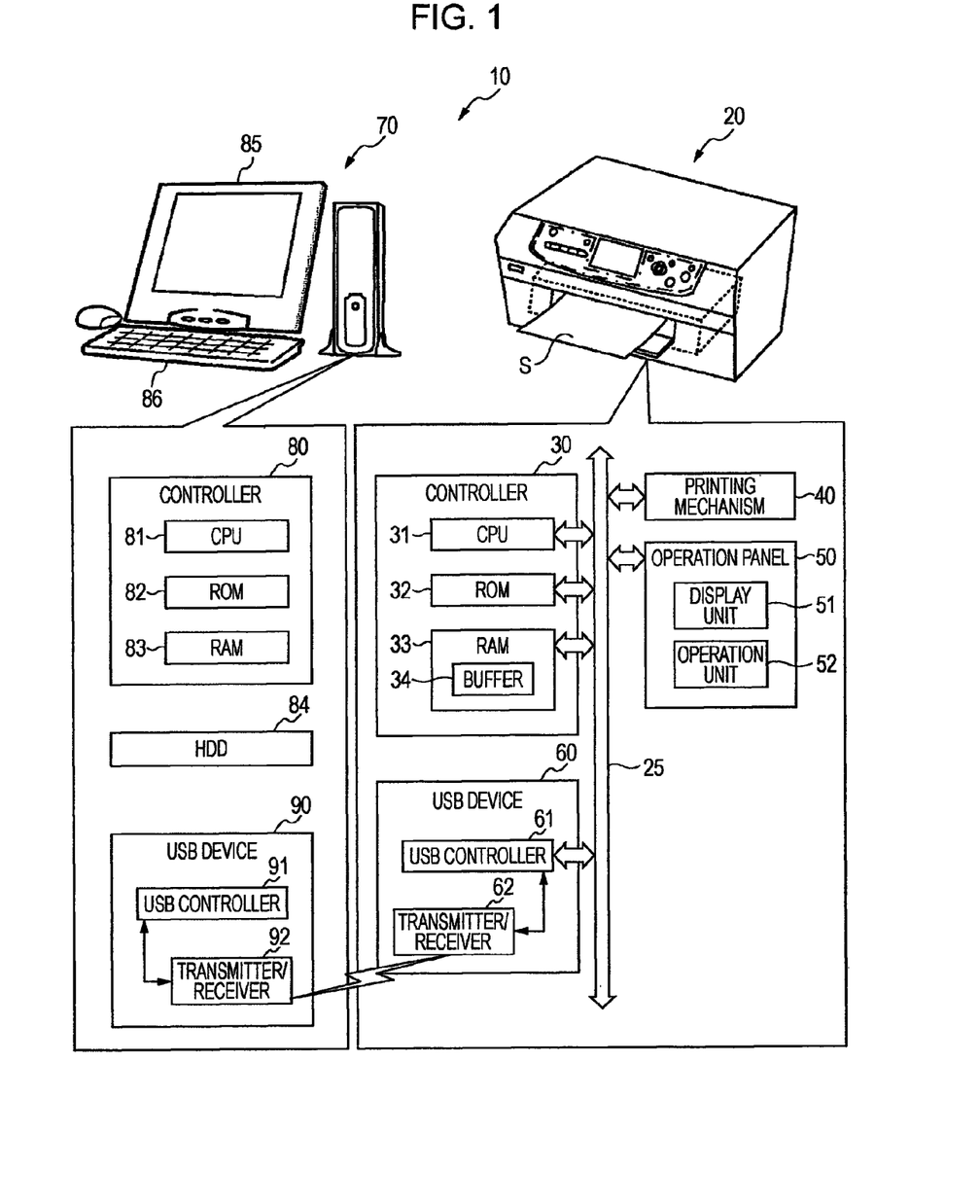
FIG. 1 is a view showing the configuration of a wireless USB system including a printer according to an embodiment of the invention.

Next, the embodiments of the invention will be described with reference to the accompanying drawings. FIG. 1 is a view showing the schematic configuration of a wireless USB system 10 including a printer 20 according to an embodiment of the invention. This wireless USB system 10 functions as a USB device, and includes a printer 20 for printing image data and a user Personal Computer (PC) 70 for exchanging information with the printer 20 as a USB host via a wireless USB.

Figure 2:
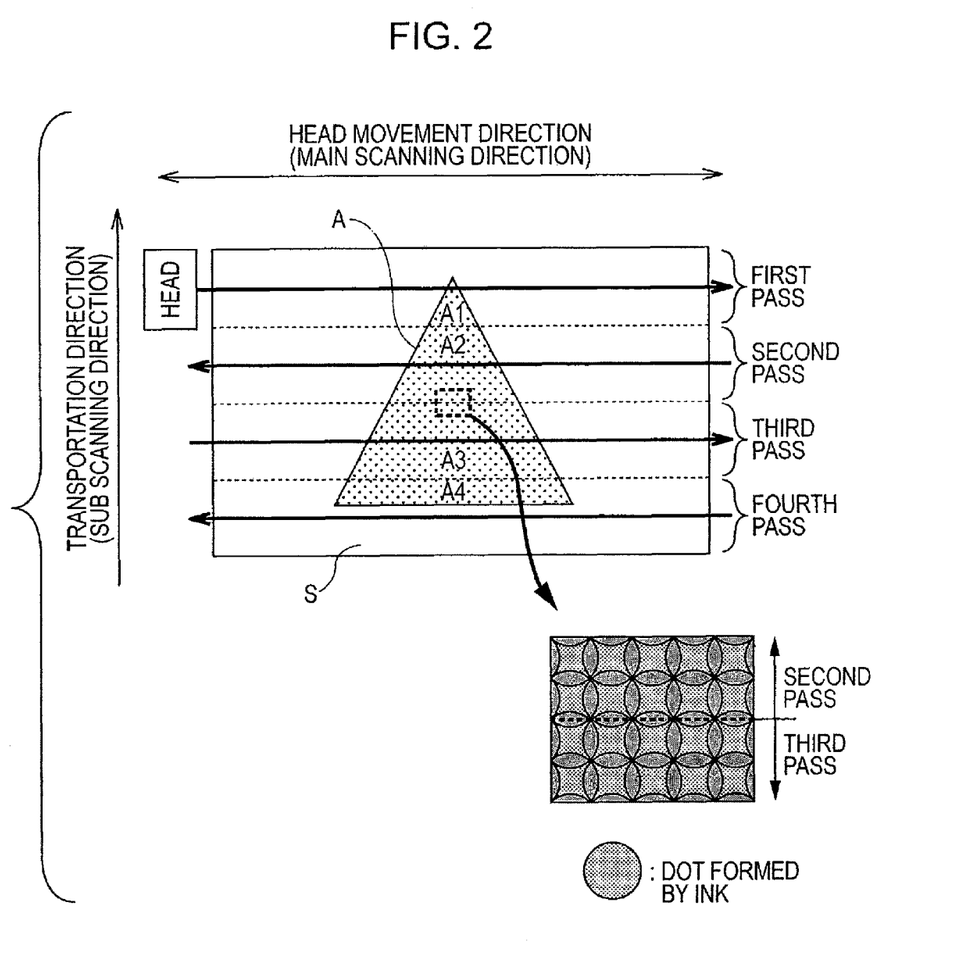
FIG. 2 is an explanatory view of the operation of a printing mechanism when an image A is formed on recording paper S.

The printer 20 includes a controller 30 for controlling the overall apparatus, a printing mechanism 40 for performing printing on recording paper S using an ink as a coloring agent, an operation panel 50 for displaying information to a user and inputting an instruction of the user, and a USB device 60 for wirelessly transmitting and receiving data to and from an external device (for example, the user PC 70). The controller 30 is constituted as a microprocessor including a CPU 31, and includes a ROM 32 for storing a variety of programs, a buffer 34 for storing image data, and a RAM 33 for temporarily storing data. This controller 30 is connected to the printing mechanism 40, the operation panel 50 and the USB device 60 via a bus 25. The printing mechanism 40 performs a printing process in an ink jet manner and includes, although not shown, ink cartridges for individually receiving inks of respective colors, a head for pressurizing the inks supplied from the ink cartridges, ejecting the inks from nozzles toward the recording paper S and forming dots, and a transportation roller for transporting the recording paper S. This printing mechanism 40 alternately performs a process of moving the head in a main scanning direction and forming an image of one pass and a process of transporting the recording paper S in a transportation direction (sub scanning direction) perpendicular to the main scanning direction so as to form an image based on the image data stored in the buffer 34 on the recording paper S. The operation of the printing mechanism 40 when a triangular image A is formed on recording paper S is shown in FIG. 2 as an example of a state in which the printing mechanism 40 forms an image. In FIG. 2, the horizontal direction denotes the main scanning direction and the vertical direction denotes the transportation direction. As shown in FIG. 2, first, the inks are ejected in an area A1, which is printed in a first pass, of the image A while the head is moved from the left end to the right side. Subsequently, the recording paper S is transported by a predetermined amount in the transportation direction and the inks are ejected in an area A2, which is printed in a second pass, while the head is moved to the left side. Similarly, the image formation of one pass and the transportation of the recording paper S are repeated such that the areas A1 to A4, that is, the image A, are formed on the recording paper S by the process of four passes. In addition, the printing mechanism 40 ejects the inks from the head so as to superpose the dots of the inks of the respective colors on the recording paper S such that the kinds of printable colors are increased by mixing the colors or a unnecessary gap (bending) between dots is prevented from being generated so as to improve image quality. The superposition of the dots is performed not only during one pass but also between passes (see an enlarged portion of a boundary between the area A2 and the area A3 of FIG. 2). The operation panel 50 is a device for allowing the user to input a variety of instructions to the printer 20, and includes a display unit 51 for displaying characters or images according to the variety of instructions or an operation unit 52 for inputting the instructions of the user by various buttons. The USB device 60 includes a USB controller 61 for controlling the exchange of information with the wirelessly connected external device and a transmitter/receiver 62 for wirelessly transmitting and receiving data to and from a USB host device.

The user PC 70 is a known general-purpose PC and includes a controller 80 including a CPU 81 for executing a variety of controls, a ROM 82 for storing a variety of control programs and a RAM 83 for temporarily storing data, a HDD 84 which is a mass memory for storing a variety of application programs or a variety of data files, and a USB device 90 for wirelessly transmitting and receiving data to and from an external device (for example, the printer 20). The USB device 90 includes a USB controller 91 for controlling the exchange of information with the wirelessly connected external device and a transmitter/receiver 92 for wirelessly transmitting and receiving data to and from the USB device. The user PC 70 includes a display 85 for displaying a variety of information on a screen or an input device 86 for allowing the user to input a variety of instructions, such as a keyboard and a mouse. This user PC 70 instructs the printer 20 to print image data by an installed program.

Next, the operation of the printer 20 of the present embodiment having the above-described configuration, and, more particularly, the operation for receiving image data by the instruction from the user PC 70 and printing an image based on the received image data on the recording paper S by the printing mechanism 40 will be described.

Figures 3, 3A:
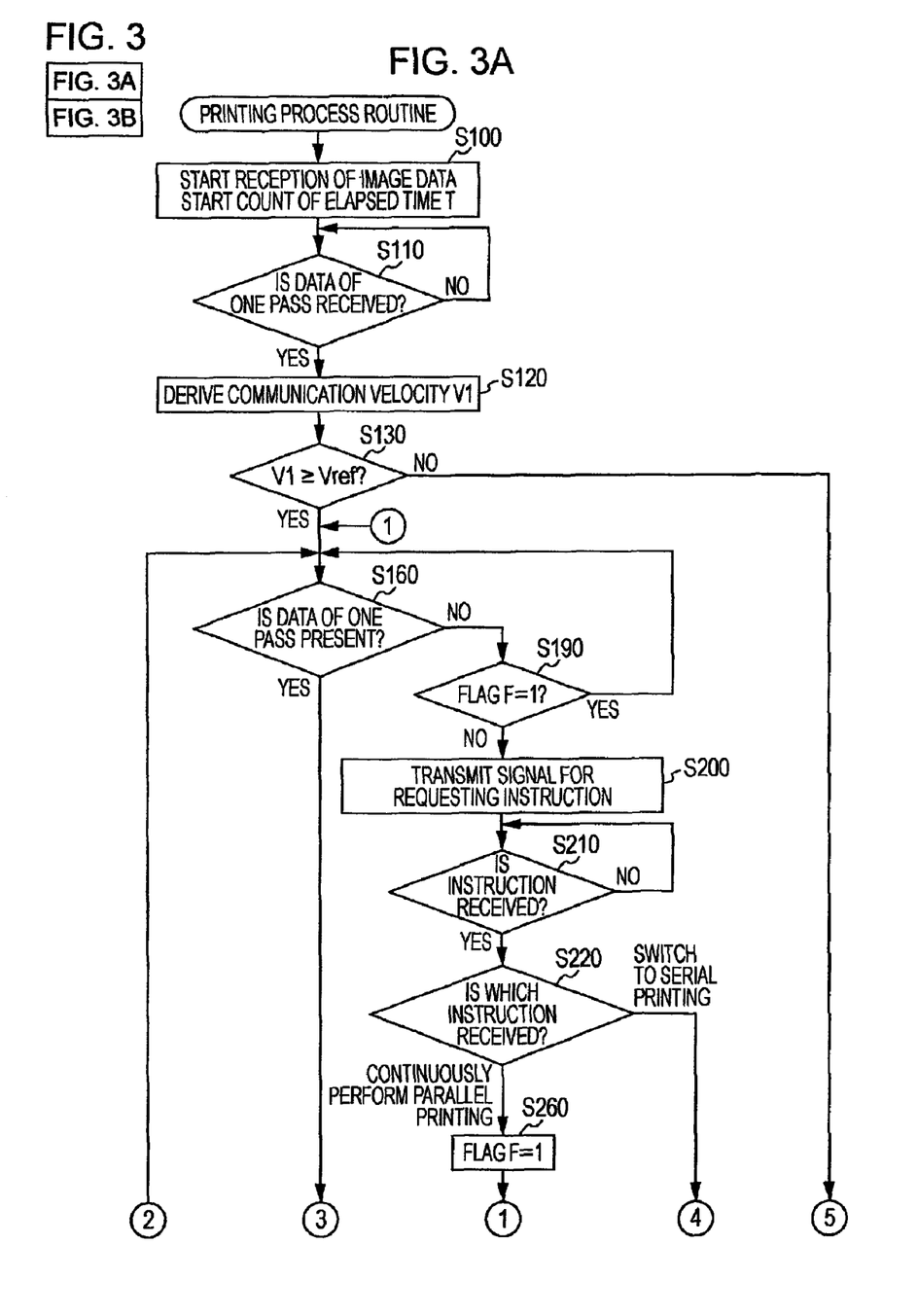
FIG. 3 is a flowchart showing an example of a printing process routine.
Figure 3B:
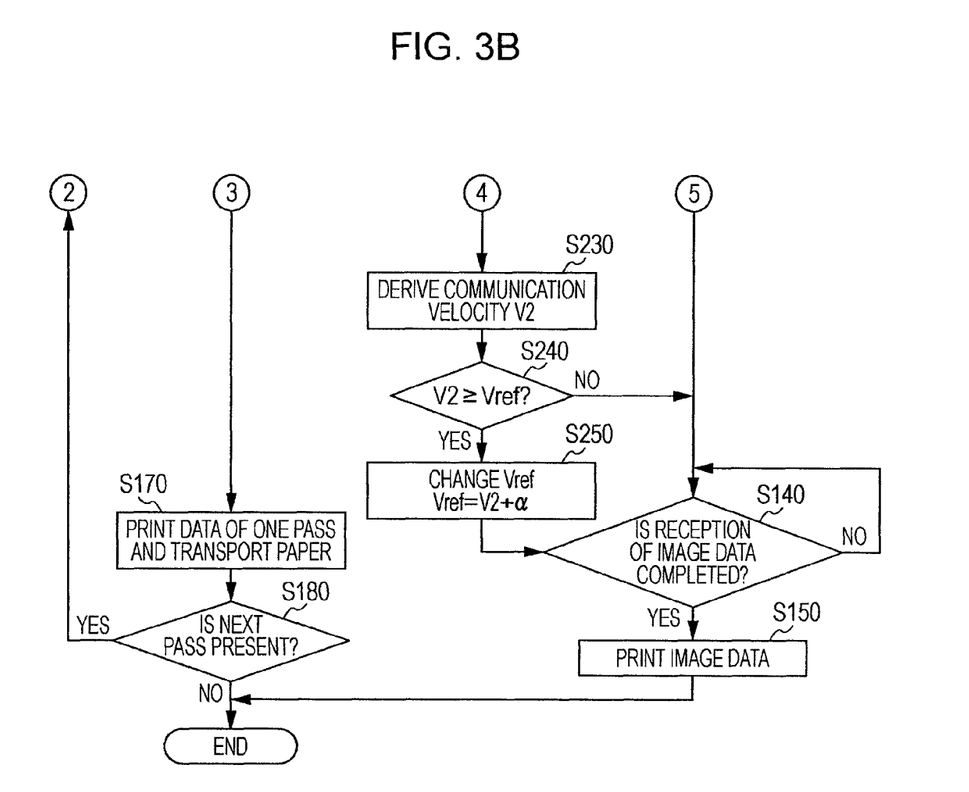

FIG. 3 is a flowchart showing an example of a printing process routine. This routine is executed when the printer 20 and the user PC 70 are connected by the wireless USB and the user operates the input device 86 so as to instruct the printer 20 to print specified image data (for example, image data stored in the HDD 84). When this printing process routine is executed, the CPU 31 first starts the USB controller 61 to receive image data and starts the count of an elapsed time T (step S100). In this way, the USB controller 61 controls the transmitter/receiver 62 to receive the image data transmitted from the transmitter/receiver 92 of the user PC 70, and starts a process of storing the received image data in a buffer 34. Then, the CPU 31 determines whether or not the image data of one pass is stored in the buffer 34 (step S110) and repeats the process of step S110 until the determination is positive.

In the determination in step S110 is positive, the CPU 31 derives a communication velocity V1 of the user PC 70 and the printer 20 (step S120). The communication velocity V1 is derived by dividing the amount of image data of a first one pass by the elapsed time T when the determination in step S110 is positive. Then, it is determined whether or not the communication velocity V1 is equal to or greater than a threshold Vref (step S130). The threshold Vref is a reference value of the communication velocity which is decided such that the communication velocity is sufficiently fast if the communication velocity of the user PC 70 and the printer 20 exceeds the threshold Vref. The sufficiently fast communication velocity indicates that the communication velocity is high such that printing is completed without a pause even when printing the image data in parallel with the reception of image data. The value of the threshold Vref may be set based on the operation velocity of the printing mechanism 40, such as the operation velocity of the head or the transportation roller, in advance. In addition, the threshold Vref may set to any value by the user.

If the determination in step S130 is negative, it is determined that, when the printing of image data is performed in parallel with the reception of image data, the image data is not received in time, the printing pauses and thus the image quality deteriorates. Accordingly, the USB controller 61 waits until receiving and storing all image data in the buffer 34 (step S140), and controls the printing mechanism 40 to print the image data stored in the buffer 34 when all the image data is stored (step S150), and the present routine is completed. Then, the printing mechanism 40 acquires the image data stored in the buffer 34, repeats the printing of one pass and the transportation of the recording paper S, and forms an image based on the image data on the recording paper S. Hereinafter, the printing of the image data stored in the buffer 34 after storing all the image data in the buffer 34 is referred to as a serial printing process.

In contrast, if the determination in step S130 is positive, it is determined whether or not the image data of one pass, which will be printed next time, is stored in the buffer 34 (step S160). Now, since a state in which printing is not started is considered and the image data of at least the first one pass is stored in the buffer 34 in step S110, the determination is positive. If the determination in step S160 is positive, the printing mechanism 40 is controlled such that the image data of one pass, which will be printed next time, out of the image data stored in the buffer 34 is printed and the recording paper S is transported (step S170). Now, since the state in which the printing is not started is considered, the image of one pass based on the image data of the first one pass is printed on the recording paper S. Then, it is determined whether or not a next pass is present (step S180). When the determination is positive, the process of step S160 is executed so as to determine whether or not the image data of one pass, which will be printed next time, is stored in the buffer 34. If the reception velocity of the image is sufficiently fast and the image data of the next one pass is stored in the buffer 34 while the printing of one pass is performed in step S170, the determination in step S160 is always positive and thus the processes of steps S160 to S180 are repeated. If the determination in step S180 is negative, it is determined that the printing of all the image data is completed and the present routine is completed. Accordingly, the printing of the image data is performed in parallel with the reception of the image so as to form an image based on the image data on the recording paper S. Hereinafter, the printing of the image data which is performed in parallel with the reception of the image data is referred to as a parallel printing process.

In contrast, if the image data of next one pass is not stored in the buffer 34 while the printing of one pass is performed in step S170, the determination in step S160 is negative. This is generated when the communication velocity of the user PC 70 and the printer 20 is reduced due to noise or the reduction of the processing velocities of the USB devices 60 and 90 or when the threshold Vref is not suitable. If the determination in step S160 is negative, it is determined whether or not a parallel printing process continuance flag F is 1 (step S190). Although described later, since the parallel printing process continuance flag F is set to an initial value of 0 when starting the present routine, the determination is negative. This state refers to a state in which, if the parallel printing process is continuously performed, the image data is not received in time, the printing of the image needs to pause, the superposition of the ink dots between the passes are not performed well, and the image quality deteriorates. The CPU 31 controls the USB controller 61 to allow the user to instruct whether the parallel printing process is switched to the serial printing process or the parallel printing process is continuously performed (step S200). Then, the USB controller 61 transmits a request signal for requesting an instruction from the transmitter/receiver 62 to the transmitter/receiver 92 of the user PC 70. In the user PC 70, the request signal received by the transmitter/receiver 92 is transmitted to the CPU 81 via the USB controller 91, and the CPU 81 displays an instruction request screen (not shown) on the display 85 so as to request the instruction to the user. The user operates the input device 86, inputs the instruction for switching to the serial printing process when the printing quality is preferential, and inputs the instruction for continuously performing the parallel printing process if the printing velocity is preferential. Then, the CPU 81 controls the USB controller 91 and transmits the instruction for the user to the printer 20.

The CPU 31 of the printer 20 waits until the transmitter/receiver 62 receives the instruction after the process of step S200 is executed (step S210) and determines whether the received instruction is the instruction for switching to the serial printing process or the instruction for continuously performing the parallel printing process (step S220). If the instruction is the instruction for switching to the serial printing process, the communication velocity V2 is derived as the amount of image data per unit time of the reception of the transmitter/receiver 62 (step S230). Subsequently, it is determined whether the communication velocity V2 is equal to or greater than the threshold Vref (step S240) and, if the determination is positive, the value of the threshold Vref is changed to a value derived from Equation 1 (step S250). That is, since the determination in step S160 is negative in spite that the current communication velocity V2 is equal to or greater than the threshold Vref, it is determined that the value of the threshold Vref is not suitable, and the value of the threshold Vref is changed such that the communication velocity V2 is less than the threshold Vref. Since the parallel printing process pauses in this time, the printing process pauses at least one time. However, when the printing process routine is executed next time, the determination in step S130 is negative even at the same communication velocity as the communication velocity V2, the serial printing process is performed from the start and the temporary pause of the parallel printing process can be prevented. In addition, the value α of Equation 1 is a positive value and is previously set to a value considering the error of the communication velocity V2 or a value with a margin for preventing the pause of the parallel printing process. In contrast, when the communication velocity is temporarily reduced, the determination in step S240 is negative and the CPU 31 does not change the threshold Vref. When the process of step S250 is executed or the determination in step S240 is negative, steps S140 and S150 are progressed, the serial printing process is performed, and the present routine is completed.

$$Vref = V2 + \alpha \quad \text{Equation 1}$$

In contrast, if the instruction determined in step S220 is the instruction for continuously performing the parallel printing process, the parallel printing process continuance flag F is set to a value 1 (step S260) and the process progresses to step S160. Here, the parallel printing process continuance flag F is set to a value 1 if the user instructs the parallel printing process to be continuously performed so as to complete fast the printing process even when the image data is not received in time and the printing of the image data pauses such that image quality deteriorates. If the data of one pass, which will be printed next time, is not yet stored in the buffer 34 in step S160, the determination is negative and the process progresses to step S190. However, since the parallel printing process continuance flag F is set to a value 1, the determination in step S190 is positive and the process returns to step S160. Thereafter, when the processes of steps S160 and 190 are repeated, the printing pauses and the data of one pass, which will be printed next time, is stored in the buffer 34, the determination in step S160 is positive, the process progresses to step S170, and the printing of one pass is performed. In this way, the parallel printing process is continuously performed while the printing pauses, until the pass which will be printed next time is removed. When the printing of all passes is completed, the determination in step S180 is negative and the present routine is completed. When the present routine is completed, the parallel printing process continuance flag F is initialized to a value of 0.

Now, the correspondence between the components of the present embodiment and the components of the invention will be clarified. The transmitter/receiver 62 of the present embodiment corresponds to a communication unit, the buffer 34 corresponds to a storage unit, the printing mechanism 40 corresponds to an image forming unit, and the CPU 31 and the USB controller 61 correspond to a control unit.

According to the above-described embodiment, the parallel printing process is performed when the communication velocity V1 is equal to or greater than the threshold Vref and the serial printing process is performed when the communication velocity is less than the threshold Vref. To this end, since the printing of the image data and the reception and the storage of the image data are performed in parallel when the communication velocity is equal to or greater than the threshold Vref, it is possible to faster complete the printing of the image. In addition, when the communication velocity is less than the threshold Vref, the printing is performed after all image data is received. Accordingly, it is possible to prevent deterioration of the image quality due to the pause of the repetition of the printing of one pass. Since the printer 20 and the user PC 70 are connected by the wireless USB, the communication velocity is apt to be decreased compared with wired connection and the determination which of the serial printing process and the parallel printing process is performed according to the communication velocity V1 is of great significance. Since the communication velocity V1 is derived by dividing the amount of image data of first one pass by a time necessary for receiving the image data of the first one pass, it may be adequately determined which of the serial printing process and the parallel printing process is performed based on the actual reception velocity of the image data. Since the communication velocity V1 is derived using a period until image data of first one pass is received, which is a period in which the printing mechanism 40 cannot perform printing, it is possible to perform a suitable determination without increasing a processing time. If it is determined that image data is not received in time and the printing of the image data needs to pause during the parallel printing process, the instruction is requested to the user PC 70 so as to determine whether the process is switched to the serial printing process or the parallel printing process is continuously performed according to the instruction received from the user PC 70, the user can select which of printing quality and printing velocity is preferential. When the parallel printing process pauses and the serial printing process is performed, the threshold Vref is changed such that the communication velocity V2 is less than the threshold Vref. Therefore, when the printing process routine is executed next time, the serial printing process is performed from start even at the same communication velocity as the communication velocity V2 and thus the pause of the parallel printing process can be prevented.

The invention is not limited to the above-described embodiment and may be variously modified without departing from the technical range of the invention.

For example, in the printing process routine, the processes of steps S230 to S250 may be omitted, and the process may progress to step S140 so as to perform the serial printing process when the instruction defined in step S220 is the instruction for switching to the serial printing process. Alternatively, the processes of steps S190 to S260 may be omitted, and the process may progress to step S140 so as to perform the serial printing process if the determination in step S160 is negative, or the process of step S160 may be repeated until the image data of one pass, which will be printed next time, is stored in the buffer 34 so as to perform the parallel printing process even when the pause of the printing process is generated, if the determination in step S160 is negative.

Although the communication velocity V1 is derived by dividing the amount of image data of first one pass by the elapsed time T when the determination in step S110 is positive in the above-described embodiment, other methods may be used. For example, the communication velocity may be derived as the amount of image data per very short unit time when the determination in step S110 is positive or the communication velocity when the connection between the user PC 70 and the printer 20 by the wireless USB is established may be used as the communication velocity V1.

Although the printer 20 and the user PC 70 are wirelessly connected by the wireless USB in the above-described embodiment, other wireless or wired connection methods may be used.

Although it is determined which of the parallel printing process and the serial printing process is performed by determining whether the communication velocity of the printer 20 and the user PC 70 is equal to or greater than the threshold Vref in the above-described embodiment, the distance between the printer 20 and the user PC 70 may be measured and it may be determined whether the measured distance is less or greater than a threshold Dref. The process of measuring the distance may be performed, for example, using a positional measurement function of an Ultra Wide Band (UWB) which is a wireless communication scheme employed in the wireless USB, or the printer 20 may have a device for measuring a distance by other schemes and the process of measuring the distance may be performed using the device. As the method for measuring the distance, for example, there is a method for transmitting a pulse string to a device to be measured, receiving a response to the pulse sting from the device to be measured, and measuring the distance based on a reciprocal time of the pulse string. In this case, the device to be measured may receive a response delay time which is a processing time necessary for the response to the pulse string and measure the distance based on a difference between the reciprocal time and the response delay time. The value of the threshold Dref may be set as a value in which the communication velocity is greater than the threshold value Vref when the distance between the devices is less than the threshold Dref, by experiments. If it is determined which of the parallel printing process and the serial printing process is performed by the distance, the distance D1 is derived instead of the communication velocity V1 in step S120 of the printing process routine of FIG. 3, and it is determined whether the distance D1 is equal to or less than the threshold Dref in step S130. The distance D2 at that time is derived in step S230, it is determined whether the distance D2 is equal to or less than the threshold Dref in step S240, and the threshold is set to Dref=D2−β in step S250 (β is a positive number). The value β is previously set to a value considering the error of the distance D2 or a value having a margin for preventing the pause of the parallel printing process.

Although the user PC 70 instructs the printer 20 to print image data in the above-described embodiment, for example, another host device such as a digital camera or the like may instruct the printing of the image data. In addition, the printer 20 and a plurality of host devices may be connected. For example, if two host devices may be connected, one host device with a low communication velocity instructs printing, the other host device with a high communication velocity then instructs printing, the reception of image data is performed in parallel, and the printing instructed by one host device is performed by the parallel printing process, the communication velocity is low, the parallel printing process pauses, and the occupying time of the printing mechanism 40 is increased. As a result, the printing may not be started even when the reception of the image data is completed with respect to the printing instructed by the other host device. However, if the printing of one device with the low communication velocity is performed by the serial printing process in the above-described printing process routine, the printing instructed by the other host device can be completed by the parallel printing process. If the printer 20 and the plurality of host devices are connected, the above-described printing process routine is executed so as to prevent the pause of the parallel printing process, prevent the occupying time of the printing mechanism 40 from being increased by one host device, and reduce the standby time of the printing instructed by the other host device.

Although the printing mechanism 40 is an ink jet mechanism for applying pressure to the inks and ejecting the inks onto the recording paper S in the above-described embodiment, the mechanism for applying the pressure to the inks may be implemented by deformation of a piezoelectric element or generation bubbles due to heat of a heater. Although the printing mechanism 40 prepares an odd-numbered pass in a going path of the head and prepares an even-numbered pass in a returning path of the head as shown in FIG. 2, all passes may be prepared in the going path. Although the printing mechanism 40 performs printing such that areas between passes are adjacent so as to overlap in the boundary therebetween, the printing may be performed such that at least portions of the areas between the passes overlap. The printing mechanism 40 may be a line printer which has a head for performing printing by ejecting the inks of one pass once and repeats the ejection of one time and the transportation of recording paper S to perform printing.

Although the printer 20 including the ink jet printing mechanism 40 is used as the image forming apparatus of the invention in the above-described embodiment, a fluid ejecting apparatus for ejecting a liquid other than an ink, a liquid body (dispersion liquid) in which particles made of a functional material are dispersed, or a fluid body such as gel, or a fluid ejecting apparatus for ejecting a solid capable of being ejected as a fluid may be used. For example, a liquid ejecting apparatus that ejects a material such as an electrode material or a coloring material used for manufacturing a display, an EL (electroluminescent) display or a field emission display, or a liquid body ejecting apparatus for ejecting a liquid body in which the same material is dispersed, and a liquid ejecting apparatus that ejects liquid, which is a sample and is used as a precision pipette, may be used. In addition, a liquid ejecting apparatus that ejects a transparent resin liquid, such as an ultraviolet curing resin, for forming a microscopic semi-spherical lens (optical lens) used for an optical communication element, or the like, on a substrate, a liquid ejecting apparatus that ejects an etchant, such as acid or alkali, in order to perform etching on the substrate, a fluid body ejecting apparatus for ejecting gel, and an ejecting apparatus that ejects solid, which is, for example, particles such as a toner may be used.

What is claimed is:

1. An image forming apparatus which receives image data from a host device by communication and forms an image based on the image data on a target, the image forming apparatus comprising:
    a communication unit which receives the image data by the communication with the host device;
    a storage unit which is able to store the received image data;
    an image forming unit which ejects a fluid, to overlap one partial image forming process with another partial image forming process, in performing of an image forming process of forming the image on the target by ejecting the fluid from nozzles on a portion of the target and performing a partial image forming process of forming a portion of the image based on the image data stored in the storage unit on the target plural times;
    a control unit which performs a parallel control for controlling the received image data to be stored in the storage unit and controlling the image forming unit to perform the image forming process when a communication velocity of the communication unit and the host device is greater than a predetermined reference velocity, and performs a serial control for controlling the received image data to be stored in the storage unit and controlling the image forming unit to perform the image forming process after the storage unit stores all the image data when the communication velocity of the communication unit and the image forming unit is less than the reference velocity.

2. The image forming apparatus according to claim 1, wherein the communication unit performs wireless communication with the host device and receives the image data.

3. The image forming apparatus according to claim 1, wherein:
    the partial image forming process moves the nozzles in a main scanning direction one time and forms the image based on the image data of one pass on the target by the fluid,
    the image forming process forms the image based on the image data on the target by alternately performing the partial image forming process and a transportation process of transporting the target by a predetermined amount in a sub scanning direction perpendicular to the main scanning direction, and
    the control unit derives the communication velocity by dividing the amount of image data of first one pass in the image forming process by a time necessary for receiving the image data of the first one pass by the communication unit.

4. The image forming apparatus according to claim 1, wherein the control unit (1) stops the parallel control and performs the serial control or (2) controls the host device to request an instruction for stopping the parallel control and switching to the serial control or continuously performing the parallel control to the user of the host device via the communication unit when it is determined that the processing velocity of the image data in the image forming process is faster that in the process of storing the image data in the storage unit and the image forming process needs to pause during the parallel control, stops the parallel control and performs the serial control when the communication unit receives the instruction for switching to the serial control from the host device, and continuously performs the parallel control while the image forming process properly pauses when the communication unit receives the instruction for continuously performing the parallel control from the host device.

5. The image forming apparatus according to claim 4, wherein the control unit changes the reference velocity such that the communication velocity is less than the reference velocity, when the parallel control is stopped and the serial control is performed.

6. The image forming apparatus according to claim 2, further comprising a distance measuring unit which measures the distance between the host device and the image forming apparatus,
    wherein the control unit determines that the communication velocity of the communication unit and the host device is greater than the reference velocity and performs the parallel control when the measured distance is less than the predetermined distance, and determines that the communication velocity of the communication unit and the host device is less than the reference velocity and performs the serial control when the measured distance is greater than the predetermined distance.

7. The image forming apparatus according to claim 6, wherein the control unit (1) stops the parallel control and performs the serial control or (2) controls the host device to request an instruction for stopping the parallel control and switching to the serial control or continuously performing the parallel control to the user of the host device via the communication unit when it is determined that the processing velocity of the image data in the image forming process is faster that in the process of storing the image data in the storage unit and the image forming process needs to pause during the parallel control, stops the parallel control and performs the serial control when the communication unit receives the instruction for switching to the serial control from the host device, and continuously performs the parallel control while the image forming process properly pauses when the communication unit receives the instruction for continuously performing the parallel control from the host device.

8. The image forming apparatus according to claim 7, wherein the control unit changes the reference distance such that the measured distance is greater than the reference distance, when the parallel control is stopped and the serial control is performed.

* * * * *